May 27, 1952 H. J. KOCH ET AL 2,597,874
LOCKING STEM ADJUSTMENT VALVE
Filed Aug. 30, 1947 2 SHEETS—SHEET 1
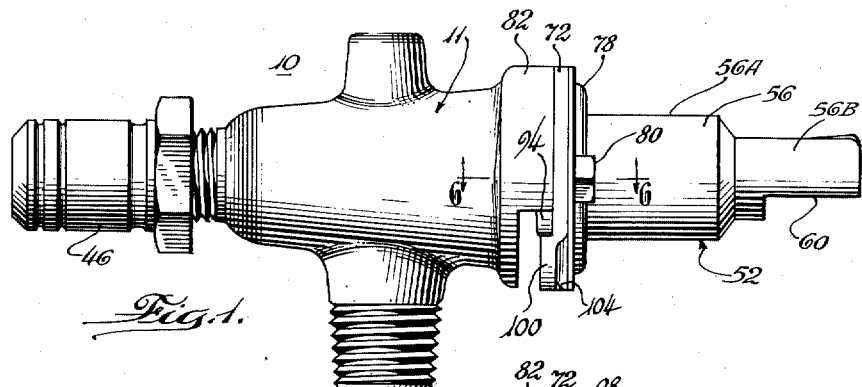
Fig. 1.
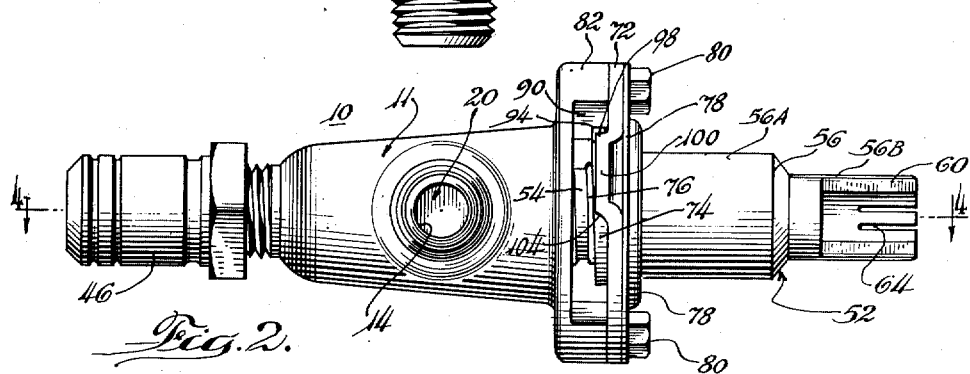
Fig. 2.
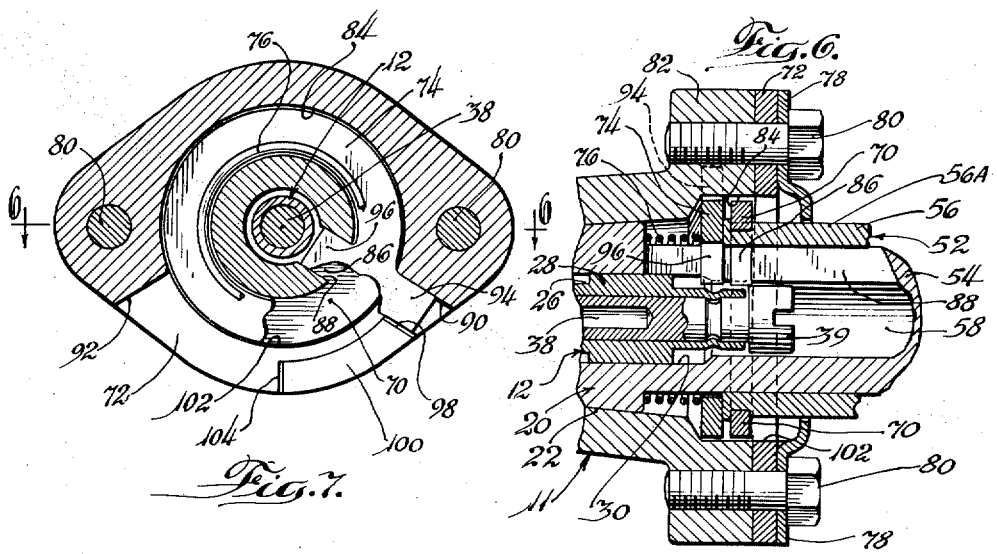
Fig. 7.
Fig. 6.
Inventors:
Henry J. Koch
Charles C. Lamar
By Hinkle, Horton, Aleberg, Hanemann & Kupper
Attorneys.

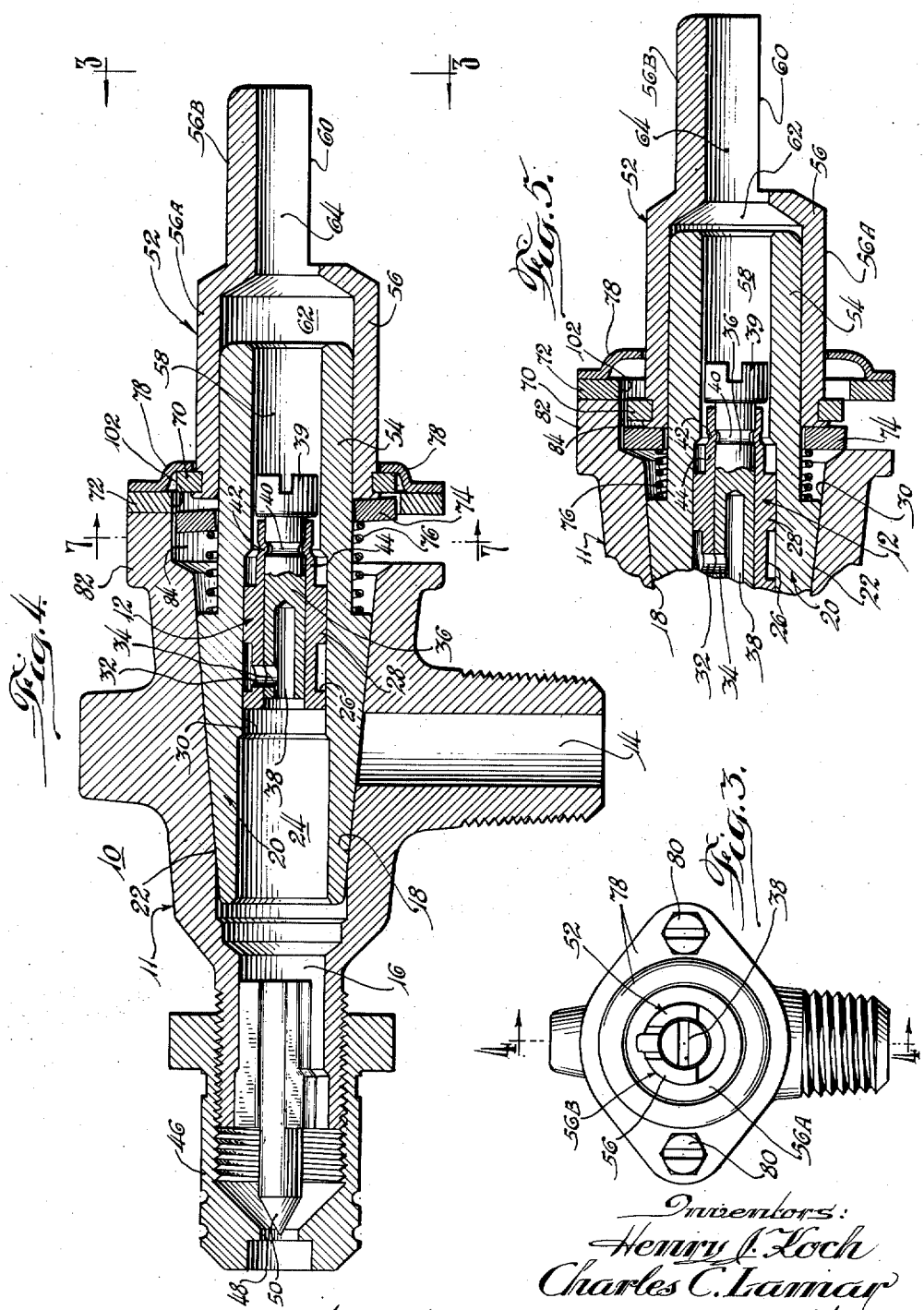

Patented May 27, 1952

2,597,874

UNITED STATES PATENT OFFICE 2,597,874

LOCKING STEM ADJUSTMENT VALVE

Henry J. Koch and Charles C. Lamar, Chicago, Ill., assignors to Harper-Wyman Company, Chicago, Ill., a corporation of Illinois Application August 30, 1947, Serial No. 771,484

4 Claims. (Cl. 277—19)

The present invention relates to gas valves and has for its primary object the provision of a new and improved locking stem adjustment gas valve.

A further object of the present invention is to provide a new and improved locking stem adjustment valve in which the valve is locked in off position by a simple and compact mechanism.

A further object of the present invention is to provide a valve of the foregoing character comprising what may be considered a two-part stem and in which the parts of the stem are connected by bearing surfaces which minimize the "shake" between the parts of the stem and wherein the stem adjustment means is readily accessible through the stem as in the case of conventional valves having stems comprising a single part.

A further object of the present invention is to provide a new and improved valve locking and position indicating mechanism wherein a portion of the means for locking the valve is utilized also to indicate another position of the valve by resisting movement of the valve.

Other objects and advantages of the invention will become apparent from the following description of an embodiment thereof in the course of which reference is had to the accompanying drawings, in which:

Fig. 1 is a side elevational view of a valve constructed in accordance with the present invention, the valve handle being omitted;

Fig. 2 is a bottom elevational view of the valve shown in Fig. 1;

Fig. 3 is an end elevational view of the valve viewed from the line 3—3 of Fig. 4;

Fig. 4 is an enlarged axial cross sectional view of the valve taken along the line 4—4 of Fig. 2, the valve being shown in its off and locked position;

Fig. 5 is a fragmentary view similar to Fig. 4, but illustrating the valve unlocked and ready to be moved from its off to an operative position;

Fig. 6 is a fragmentary horizontal cross sectional view, also illustrating the valve in unlocked position and ready to be moved from the off position to an operative position, this view being taken along the lines 6—6 of Figs. 1 and 7; and Fig. 7 is a transverse cross sectional view taken along the line 7—7 of Fig. 4.

The present invention has been illustrated in conjunction with a plural position gas valve 10 of the type commonly called a high-low valve having a valve body 11 and a novel stem adjustment means comprising a valve unit 12, see Figs. 4, 5 and 6, adjustable for the purpose of determining the flow of gas in the low position of the valve, and including features disclosed and claimed in the copending application of Vincent C. Peterson, Serial No. 600,795, filed June 21, 1945, now Patent No. 2,590,569 dated March 25, 1952. The stem adjustment means also includes features disclosed and claimed in the copending application of Philip S. Harper, Serial No. 576,673, filed February 7, 1945, now Patent No. 2,590,532 dated March 25, 1952.

The present invention has to do with a position indicating and locking mechanism which will be described in detail hereinafter but sufficient details of the valve will be described in order to provide an understanding of the advantages and operation of the indicating and locking means.

The valve body 11 has an inlet passageway 14, an outlet passageway 16 and a tapered plug receiving chamber 18. It includes also a valve plug indicated as a whole by reference character 20 and having a tapered outer surface 22 closely fitting within the tapered plug receiving chamber 18. The valve plug includes an axial passageway 24 and a pair of radial passageways, not shown, one of which provides communication directly from the exterior of the valve plug to the axial passageway 24 and thereby supplies gas directly from the inlet passageway 14 to the outlet passageway 16, through the axial passageway 24 in the valve plug. The other of the passageways in the valve plug provides communication between the inlet passageway 14 to the axial passageway 24 through the stem adjustment means 12. It connects the inlet passageway 14 with an annular passageway 26 formed at the exterior of an insert 28 fixedly secured in gastight manner within an axial passageway 30 formed in the valve plug and communicating with the axial passageway 24.

In the low position of the valve, gas is supplied to the annular passageway 26 and thence through radial openings 32 and 34 in the insert and in a rotatable valve member 36, respectively, and an axial passageway 38 in the latter leading to the axial passageway 24. The rotatable valve member 36 of the stem adjusting means is provided with a slotted head 39 whereby the degree of registry between the openings 32 and 34 is adjustable to adjust the effective size of the orifice defined by them and thus to regulate the quantity of gas supplied to the burner in the low position of the valve.

Gas is prevented from escaping through the stem adjustment means by a seal including an annular groove 40 in the valve member 36 into which is depressed an annular portion 42 of the reduced diameter outer end 44 of the insert 28.

It should perhaps be mentioned that gas is supplied to the burner from the outlet passageway 16 through an adjustable hood 46 having an orifice 48 cooperatively associated with a conical headed pin 50 fixedly secured in the passageway 16

The present invention provides means for locking the valve plug in its off position, for indicating the low position, and by a means so constructed and arranged that the stem adjustment means is readily accessible for the purpose of adjusting the flow of gas in the low position.

The construction of the present invention includes what may be considered a two-part stem, the stem as a whole being indicated by reference character 52 and including the parts 54 and 56, which are secured together for angular movement but which are axially movable relative to each other, as will be described in detail shortly. While the two parts 54 and 56 have been stated to be parts of the stem, this is a matter of preference for the part 54 may also be considered to be an extension of the valve plug with which it is integral. However, for convenience, it will be referred to as a part of the stem and while it will be so claimed, it should be understood that the terminology is to be considered broadly and to include either a two-part stem or a stem and valve plug extension.

The stem portion 54, as may be noted particularly from Fig. 4, is provided with an axial passageway 58 through which the slotted head 39 of the auxiliary valve unit is accessible. The other portion 56 of the stem includes an enlarged hollow or tubular portion 56A fitting relatively closely around the outer end of portion 54 and a reduced diameter portion 56B, which is cut away at its outer end as indicated by the reference character 60, to provide a noncircular portion for receiving the valve handle, which is not shown. The parts of the outer stem portion are provided with passageways 62 and 64 in alignment with passageway 58 so that the slotted head 39 of the auxiliary valve unit is readily accessible for adjustment.

The novel valve locking and position indicating mechanism of the present invention includes not only the two part stem 52 but also a number of cooperatively associated elements. These elements include a drive washer 70 drivingly connecting the two parts of the stem for angular movement but permitting axial relative movement between them, a locking plate 72, a locking and indicating washer 74, a spring 76 biasing the valve plug into the plug receiving chamber and the washer 74 and outer stem part 56 against an end cap 78 secured as by a pair of screws 80 to extension 82 of the valve body within which is a recess 84.

The arrangement of the mechanism is such that angular movement imparted to the outer stem part 56 is transmitted to the inner stem part and thus to the valve plug. The valve plug and stem are, however, locked in an off position by cooperative engagement between a hereinafter to be described portion of the locking and indicating washer 74 and the locking plate 72. The lock is adapted to be released by inward movement of the outer valve stem portion 56 and it remains unlocked after the valve plug has been rotated a slight distance. Thereafter the valve is movable to its low and high positions—the low position being indicated by moderate restriction to movement of the valve stem when the latter is turned from its high position toward the off position and the high position is indicated by positive prevention of movement.

The driving connection between the two parts 56 and 54 of the valve stem includes the drive washer 70 secured to the former, as by clinching, having an inwardly extending tongue 86 thereon, and an axial slot 88 in the stem portion 54, as best illustrated in Figs. 6 and 7.

The interconnection between the two stem portions is such that "shake," especially sidewise shake, between the two stem portions is substantially eliminated. This results from the fact that the driving washer 70 is at the inner end of the outer stem portion and because of the relatively close fit and considerable bearing surface between the telescoping portions of the stem parts.

The relative axial movement of the two parts of the stem is provided by the tongue and slot connection between them, the slot 88 extending, as shown in Fig. 6, over a considerable length of the inner stem part 54. If desired, the slot may extend substantially to the tapered valve plug portion, as shown in Fig. 6.

The off and high positions of the valve are determined by the angularly spaced apart stops 90 and 92, respectively. These are formed by shoulders cut into the valve body extension 82. The valve plug and valve stem are positively stopped against rotation in the off and high positions by an outwardly extending tongue 94 on the locking and indicating washer 74. This washer is constrained to rotate with the valve plug by an inwardly extending tongue 96 thereon, extending into previously mentioned slot 88 in the inner stem portion 54, see particularly Figs. 6 and 7.

The valve is locked in its off position by the cooperative action of the locking and indicating washer 74 and the locking plate 72. The latter is provided with an inwardly extending and relatively sharp shoulder 98 spaced from the off position defining shoulder 90 a distance sufficient readily to receive the tongue 94 of the locking and indicating washer when the valve plug is in its off position, as best indicated in Figs. 1, 2 and 7. The shoulder 98 may be formed by indenting a peripheral portion 100 of the locking plate 72, as best illustrated in Figs. 2 and 7.

It should perhaps be mentioned that the locking plate 72 is provided with a central aperture 102 of a size readily to receive the drive washer and all but the outwardly extending tongue 94 of the locking and indicating washer. Also, the washer 74 should, preferably, fit loosely around the stem so that it can assume a slanting position.

The valve is held in locked position by the spring 76 which, as indicated heretofore, biases the locking and indicating washer and the outer stem part 56 outwardly. In its locked position, the locking and indicating washer 74 is at a slight slant, as indicated in Fig. 4, because of the fact that the major portion of the washer is inside of the locking plate and its outwardly extending tongue 94 abuts against the inner surface of the locking plate.

The valve can be readily unlocked by moving the outer valve stem part 56 inwardly to move the locking and indicating washer 74 so that its tongue is moved beyond shoulder 98. Then, when the valve is rotated a slight amount, it is held in unlocked position, the tongue riding on the inner surface of the indented portion 100 of the locking plate.

An intermediate, the low, position of the valve is indicated by moderate restriction to the rotation of the valve. This restriction is provided by an inclined shoulder 104 formed at the end of indentation 100 opposite the steep sided shoulder 98. When the valve is turned from the off toward the full on position the tongue 94 on the locking and indicating washer rides on the inner surface of the indentation 100. In the low position, it moves down the shoulder 104, after which the valve may be rotated toward the high position, which is determined by the engagement of the tongue 94 with the shoulder 92. When the valve is turned in the opposite direction, the tongue 94 engages the inclined shoulder 104 and the latter moderately restricts movement of the valve stem and plug toward the off position, thereby to provide an indication of the low position of the valve.

The operation of the valve as a whole will now be described. It is assumed that the valve is in its off position, as indicated in all figures, and that it is locked, as indicated in Figs. 1, 2, 4 and 7. Accordingly, the spring 76 holds the outer part of the valve stem 56 in its outermost position wherein the drive washer 70 abuts against the inside of end cap 78. The tongue 94 of the locking and indicating washer 74 is fixedly held between the off shoulder 90 and the steep sided shoulder 98 in the locking plate. The washer itself is inclined somewhat, as illustrated in Figs. 2 and 4.

To unlock the valve, it is necessary only to move the outer stem part 56 axially inwardly, thereby to move the locking and indicating washer inwardly so that its tongue 94 is moved beyond the shoulder 98 of indentation 100, and then to turn the valve stem and plug a slight distance so that the tongue 94 rides on the inner surface of indentation 100. The valve stem may then be released so that the outer part 56 returns to its initial position but the valve will remain unlocked. The outer valve stem part 56 is returned to its initial postion by the spring 76 and in this position the locking and indicating washer is inclined more than it was in the off position because the inner surface of the indentation is farther inward than the major part of the plate.

To move the valve plug into an operative position the valve stem is turned in a counterclockwise direction (clockwise as viewed in Fig. 7). If it is desired to turn the valve to its full on position, the valve stem and plug are turned until the tongue 94 on the locking and indicating washer abuts against the shoulder 92.

To turn the valve plug to its low position, the plug and stem are turned in the opposite direction until the tongue 94 meets the inclined shoulder 104 and its movement is moderately restricted to indicate the desired position. To move the valve plug to its off position it is rotated so that the tongue 94 rides on the inner surface of the indentation 100 and finally falls off the shoulder 98 and is locked between the latter and the shoulder 90 in the valve body. It is held in this position by the spring 76 until such time as the valve is unlocked by inward movement of the outer part of the stem.

While the present invention has been described in connection with the details of an embodiment thereof, it should be understood that such details are not intended to be limitative of the invention except in so far as set forth in the accompanying claims.

What we claim as new and desire to secure by Letters Patent of the United States is:

1. A stem adjustment high-low valve including a valve body, a valve element rotatably associated with said body for movement between off, low and high positions, a tubular extension extending outwardly from said element having an axial slot therein, a locking and indicating washer loosely fitting about said extension having inwardly and outwardly extending tongues, said inwardly extending tongue extending into said slot and constraining said washer for angular movement with said element, a locking plate fixedly secured to said valve body having an inwardly extending indentation defining a pair of spaced apart shoulders, one of said shoulders being steep sided and located so that when the valve element is in its off position the outwardly extending tongue on said washer is engageable thereby to lock said element and the other being so located as to be engaged by said outwardly extending tongue in the low position of said valve element moderately to restrict rotation of said element toward its off position, a second tubular portion fitting movably but relatively closely around said first portion, an inwardly extending tongue on said second portion extending into the axial slot in said first portion constraining the two portions for simultaneous angular movement, an end cap fitting about said second tubular portion limiting axial movement of said second tubular portion, and spring means disposed between said valve element and said locking and indicating washer for biasing the latter and said second tubular portion toward said end cap.

2. A locking type gas valve including a valve body and a rotatable valve element having a stem portion with an axially extending slot, a second stem portion surrounding the first portion and axially movable relative to it, an element driving washer fixedly secured to said second stem portion having a driving projection extending radially inwardly into said slot in said first stem portion, an axially movable locking washer encircling said first stem portion and located between said driving washer and valve element and having a radially inwardly extending driving projection extending into said slot and a radially outwardly extending locking projection, structure on said valve body having a recess adapted to receive said locking projection, and spring means encircling said first stem portion and acting on said locking washer for yieldably holding said locking projection in said recess.

3. A locking type stem adjustment gas valve including a valve body and a rotatable valve element having a hollow stem portion with an axially extending slot, a second hollow stem portion surrounding the first portion and axially movable relative to it, an element driving washer fixedly secured to said second stem portion having a driving projection extending radially inwardly into said slot in said first stem portion, an axially movable locking washer encircling said first stem portion and located between said driving washer and valve element and having a radially inwardly extending driving projection extending into said slot and a radially outwardly extending locking projection, structure on said valve body having a recess adapted to receive said locking projection, and spring means encircling said first stem portion and acting on said locking washer for yieldably holding said locking projection in said recess.

4. A locking mechanism for a gas valve including a valve body and a valve element rotating stem portion having an axially extending slot, a second stem portion surrounding the first portion and axially movable relative to it, an element driving washer fixedly secured to said second stem portion having a driving projection extending radially inwardly into said slot, an axially movable locking washer loosely surrounding said first stem portion having a drive constituting portion extending into said slot and a locking projection, structure on the valve body defining a recess adapted to receive said locking projection, and spring means encircling said first stem portion and acting on said locking washer for yieldably holding said locking projection in said recess.

HENRY J. KOCH.
CHARLES C. LAMAR.

REFERENCES CITED

The following references are of record in the file of this patent:

UNITED STATES PATENTS

| Number | Name | Date |
|---|---|---|
| 1,838,870 | Roberts | Dec. 29, 1931 |
| 2,194,714 | Mueller | Mar. 26, 1940 |
| 2,203,395 | Schoenberger | June 4, 1940 |
| 2,249,982 | Rutherford | Jan. 22, 1941 |
| 2,257,886 | Mueller | Oct. 6, 1941 |